March 29, 1960 W. I. CARLSON 2,930,314
JUICE EXTRACTOR
Filed April 15, 1957 2 Sheets-Sheet 1

INVENTOR.
Wyman I. Carlson
BY
Popp and Sommer
ATTORNEYS.

March 29, 1960

W. I. CARLSON 2,930,314

JUICE EXTRACTOR

Filed April 15, 1957

2 Sheets-Sheet 2

INVENTOR.
Wyman I. Carlson
BY
Popp and Sommer
attorneys.

2,930,314

JUICE EXTRACTOR

Wyman I. Carlson, Lewiston, N.Y., assignor to Chisholm-Ryder Company, Inc., Niagara Falls, N.Y., a corporation of New York Application April 15, 1957, Serial No. 652,849

1 Claim. (Cl. 100—147)

This invention relates to a juice extractor and more particularly to a juice extractor of the screw type in which the materials are compressed against a tubular screen while being conveyed axially therethrough by the screw and the pomace is discharged through an annular opening of adjustable size at the trailing end of the screw.

This annular pomace discharge opening is set to that size required by the particular fruit or vegetable being processed to provide the required juice recovery. If the quality of the fruit or vegetables handled changes during the processing an excessive back pressure of the pulp or pomace in the annular pomace discharge opening may build up and which alters the operating characteristics of the juice extractor.

It is the object of the present invention to provide a juice extractor in which the minimum size of the pomace discharge opening is positively controlled but which opening is capable of enlarging under excessive back pressure from the pomace passing therethrough.

Another object is to provide such a juice extractor in which the normal minimum size of the pomace discharge opening is automatically restored as operating conditions return to normal.

Figure 1:
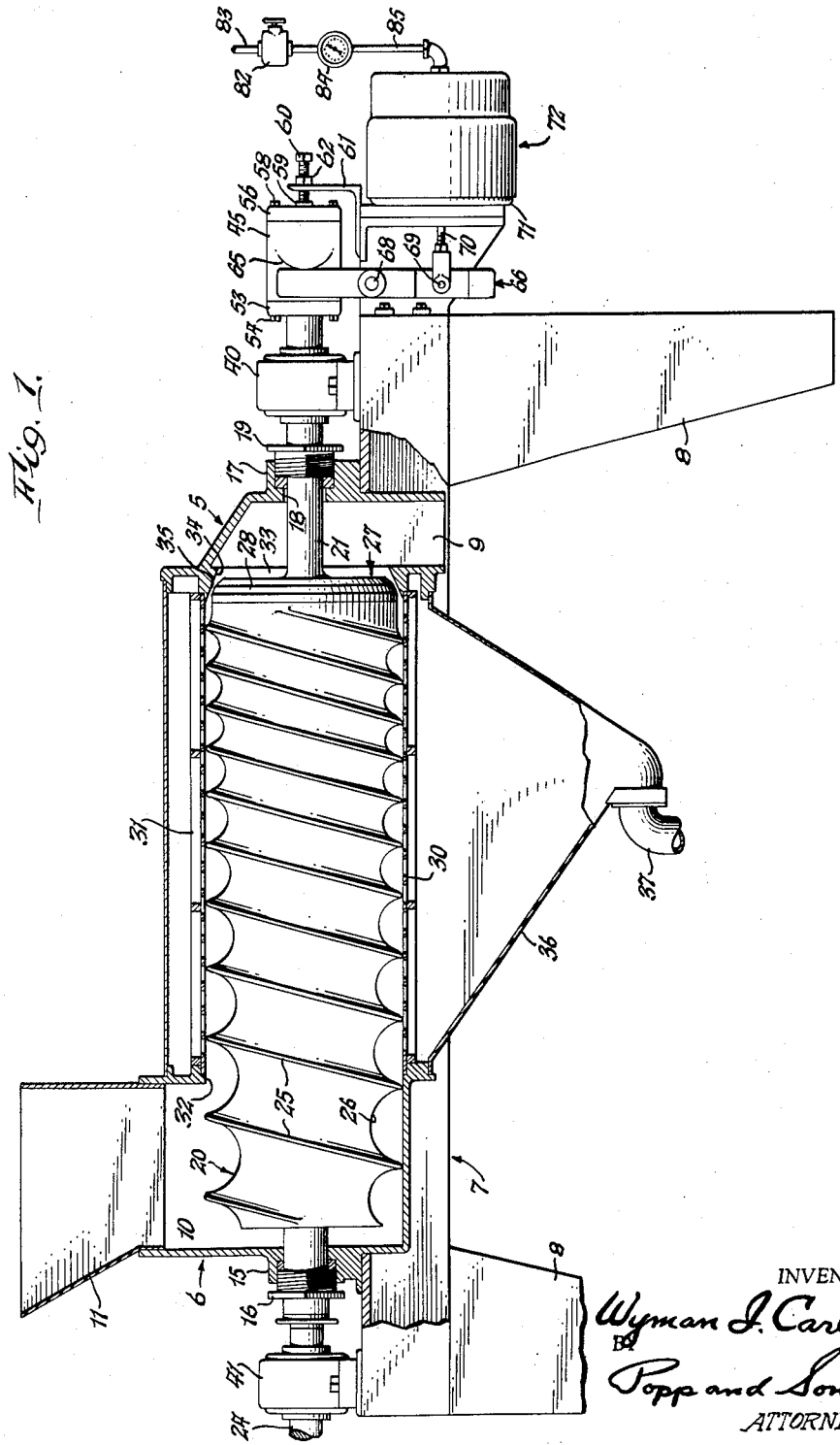

Other objects and advantages of the invention will be apparent from the following description and drawings in which Fig. 1 is a fragmentary vertical longitudinal central section through a juice extractor embodying the present invention, parts being shown in elevation.

Figure 2:
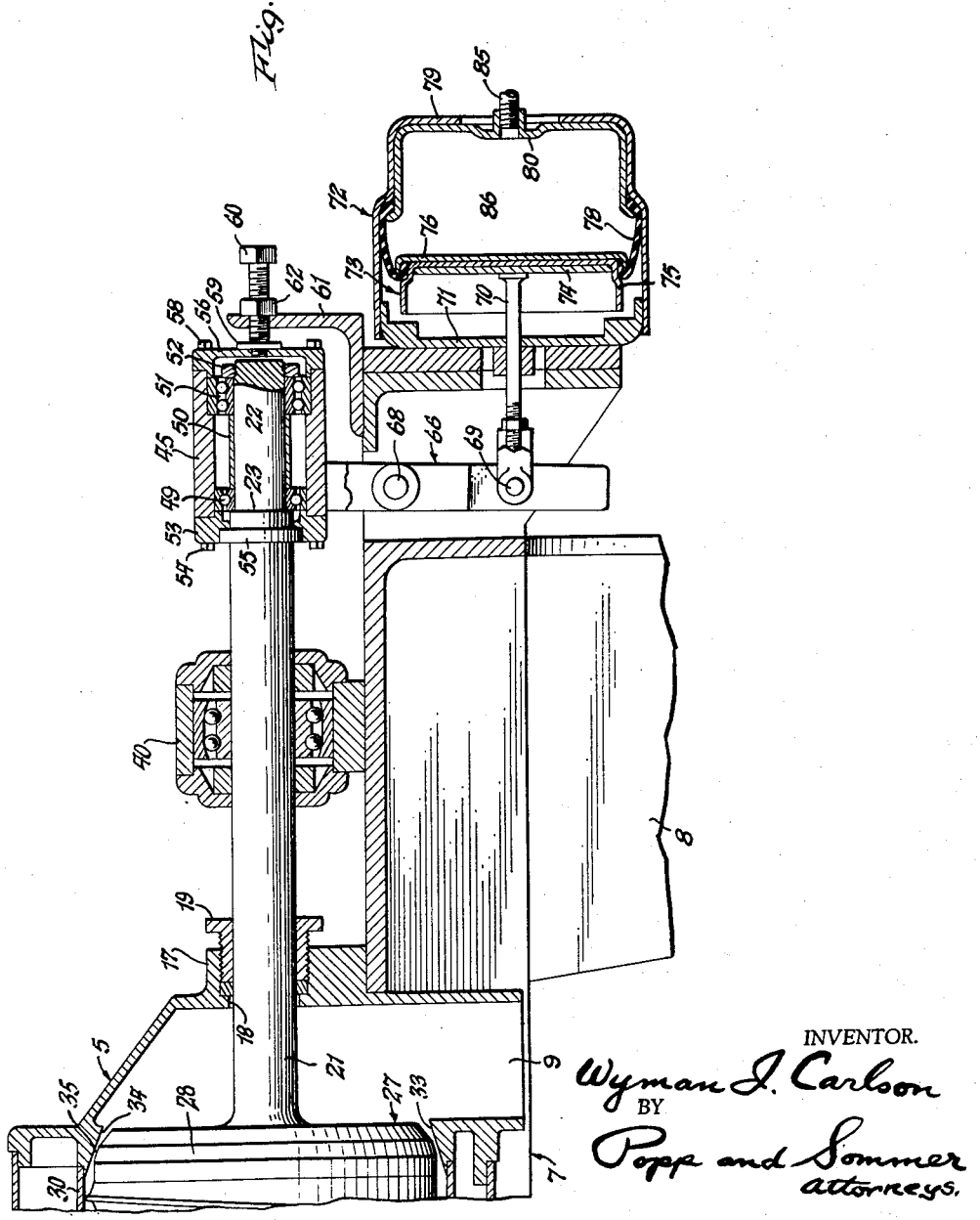

Fig. 2 is a fragmentary similar view on an enlarged scale through the discharge end of the juice extractor and showing in section the pneumatic control for the above normal size of the pomace discharge opening.

The juice extractor is shown as having a pair of end heads 5, 6 which are mounted on a base or bed 7 which can be suitably supported on legs 8. The end head 5 is preferably in the form of a casting formed to provide a pomace outlet chamber 9, which is shown as open at its bottom to permit the pomace to fall into a suitable receptable or waste duct (not shown). The end head 6 is formed to provide an inlet chamber 10 to receive the tomatoes or other materials being handled. For this purpose the upper end of the chamber 10 is open and carries a hopper 11 into which a substantial quantity of the materials being handled can be placed, these materials falling by gravity into the inlet chamber 10. The outer wall of the end head 6 is formed to provide a bearing 15, the bearing 15 being provided with a stuffing box 16 accessible from the exterior of the apparatus. The outer wall of the end head 5 is formed to provide an integral outwardly extending collar or boss 17 which is provided with a bore 18, and this bore is provided with a stuffing box 19.

The juice extractor is shown as having a large diameter screw 20 having a projecting shaft 21 at one end arranged in the bore 18 of the boss 17 and provided beyond this bore with an extension 22 of reduced diameter providing an annular shoulder 23. The bore 18 is not, however, the bearing surface for the shaft 21, this bore being slightly oversize and this shaft being journalled in a self-alining bearing as hereinafter described. At its opposite end the screw 20 is provided with a drive shaft 24.

The screw 20 is shown as provided with a thread 25 which extends continuously from the inlet chamber 10 to a point adjacent the discharge end of the screw. This thread defines a channel 26 which is of considerable depth at the feed end of the screw and becomes progressively shallower toward the discharge end of the screw. This channel or groove 26 terminates short of the extreme end of the body of the screw 20 so as to provide an annular end 27 projecting coaxially beyond the discharge end of the screw, this annular projecting end 27 being beveled, as indicated at 28.

The edges of the thread 25 contact with the internal face of a screen 30, this screen being preferably reinforced by an external frame 31 of skeleton form. The outer edges of the screw 20 are shown as being parallel with the axis of the screw, and hence the screen 30 and skeleton frame 31 are of cylindrical form. However, it will be understood that these edges, the screen and the skeleton frame can be slightly tapered. The screen 30 and its reinforcing frame 31 are preferably made in two semi-cylindrical sections to permit of convenient access to the screw 20 for the purpose of cleaning.

The opposite ends of the cylindrical screen 30 and its reinforcing frame 31 are suitably supported on the end heads 5 and 6 and the inner wall of the end head 6 is provided with a round opening 32 leading from the inlet chamber 10 into the screen 30. The inner wall of the end head 5 is similarly provided with a round opening or rim 33 leading from the interior of the screen 30 into the pomace discharge chamber 9, this opening 33 being preferably beveled, as indicated at 34, complementary to the bevel 28 on the end of the screw 20 to provide a tapered annular opening 35 controlling the discharge of the pomace by the screw into the pomace discharge chamber 9. This discharge can be controlled by the axial adjustment of the screw 20 as hereinafter described.

The juices expressed through the screen 30 are caught in a pan 36, having inclined sides leading to a duct 37, through which the juices flow by gravity to be subsequently processed.

The end shaft 21 for the screw 20 is journalled in a self-alining bearing 40 which is mounted on the base or bed 7 and the end shaft 24 is mounted in a similar self-alining bearing 41 also mounted on the base or bed 7. The screw can be turned in any suitable manner through power applied to the end shaft 24, and the self-alining bearings 40, 41 permit endwise or axial movement of the screw and its end shafts 21, 24 to vary the effective size of the tapered annular pomace discharge opening 35 between the bevel 28 of the screw 20 and the rim 34 of the end head 5.

The numeral 45 represents a sleeve surrounding the reduced end 22 of the end shaft 21, this sleeve being compelled to move axially with this end shaft and hence with the screw 20. For this purpose the inner race of a ball bearing 49 abuts against the shoulder 23 provided by this reduced shaft end 22. A spacing sleeve 50 abuts against the other side of this race and also against the inner race of a second ball bearing 51. A nut 52 on the threaded extremity of the end shaft 21 holds the inner races of the ball bearings 49, 51 and sleeve 50 against the shoulder 23. These bearings are combined radial and thrust bearings. An end ring 53 is shown as secured by screws 54 to one end of the sleeve 45 and an annular oil seal 55 is interposed between this end ring 53 and the end shaft 21. An end head 56 is shown as secured by screws 58 to the opposite end of the sleeve 45 and a flathead screw 59 is shown as screwed axially into this end head 56 to provide a wear surface for an adjusting screw 60. This adjusting screw is threadedly mounted in a bracket 61 fast to the base or bed 7. The adjusting screw is in axial alinement with the end shaft 21 and wear screw 59 and is provided with a lock nut 62 for holding it in any adjusted position.

It will be seen that this adjusting screw 60 limits the movement of the end shaft 21 of the juice extracting screw 20 to the right as viewed in the figures and hence determines the minimum spacing of the tapered annular pomace discharge opening 35 between the tapered end 28 of the screw and the surrounding rim 33 of the end head 5.

On its opposite sides the sleeve 45 is provided with a pair of rounding abutments 65 which have convex faces opposing the juice extracting screw 20. These faces engage the bifurcated upper end of a lever 66 which is pivoted to the bed or base 7 at 68. The axis of this pivot 68 is perpendicular to the axis of the juice extracting screw 20 and its end shaft 21 so that upon swinging the lever 66 clockwise as viewed in Figs. 1 and 2 the end shaft 21 and juice extracting screw 20 are held in operative abutment with the adjusting screw 60.

The lever 66 projects below the pivot 68 and this lower extremity is pivotally secured, as indicated at 69, to the end of a piston rod 70. This piston rod extends through the end head 71 of an air cylinder indicated generally at 72. The piston rod 70 connects with a three piece piston indicated generally at 73, this piston comprising a disk 74 fast to the piston rod 70, a cup-shaped head 75 fast to the disk 74 and a second cup-shaped end head 76 also fast to the disk 74. The inner rim of a flexible rubber diaphragm 78 is compressed between the rims of the cup-shaped end heads 75, 76.

The cylinder 72 is provided with an end head 79 containing a cup-shaped metal liner 80. The other rim of the flexible diaphragm 78 is compressed between the end head 79 and the rim of the metal liner 80. It will therefore be seen that the piston 73 and cylinder 72 provide in effect a bellows.

Air under pressure controlled by a valve 82 is introduced from an air pressure supply line 83 past a gage 84. This air at a controlled pressure is introduced through a line 85 into a chamber 86 formed in the bellows 72, 73. This pressure is maintained at the right hand side of the piston 73 and hence tends to force the bifurcated arm 66 in a clockwise direction as viewed in the drawings.

In operation the adjusting screw 60 is adjusted to contact the head of the wear screw 59 when the tapered annular pomace discharge opening 35 is the required size for the particular fruit or vegetable being handled. This adjusting screw 60, through the end head 56, sleeve 45 and thrust bearings 49, 51 limits the movement of the end shaft 21 and screw 20 to the right to thereby maintain this minimum size of the tapered annular pomace discharge opening 35.

The fruit or vegetables from which the juice is to be extracted are then introduced into the hopper 11 and the drive motor (not shown) started to rotate the end shaft 24 and screw 20 in the direction to force the fruit or vegetables being handled to the right along the screen 31. By reason of the diminishing depth of the channel 26 and the diminishing pitch of the thread 25, the solids of the fruit or vegetables are propelled under increasing pressure toward the discharge end of the screw 20, the liquids being expressed and escaping through the cylindrical screen 30 into the pan 36 from which they are withdrawn at 37.

At the discharge end of the juice extracting screw 20 the solids are in the form of a pomae which must pass through the tapered annular pomace discharge opening 35 between the taper 28 at the discharge end of the screw 20 and the tapered rim 33 of the end head 5. As indicated, this tapered annular opening 35 is preset to suit the particular fruit or vegetable being handled and hence in normal operation the pomace escapes through this tapered annular pomace discharge opening 35 and falls through the chamber 9 in the end head 5, the back pressure formed by this escape of the pomace determining the degree of juice extraction.

When however conditions arise, such as that occasioned by a temporary change in the quality of the fruits or vegetables being processed, and which result in an excessive back pressure being built up by the pomace escaping through the tapered annular pomace discharge opening 35, this back pressure is exerted axially of the juice extracting screw 20 so as to move it to the left as viewed in the figures. This movement of the screw to the left is not resisted by the adjusting screw 60 which merely determines the minimum size of the tapered annular pomace discharge opening 35 but does not control its maximum size. This movement of the screw 20 to the left under excessive back pressure from the pomace is resisted by the air bellows 72, 73. Thus movement of the screw 20, and its end shaft 21 to the left moves the sleeve 45 to the left, this in turn, through the abutments 65, swinging the bifurcated lever 66 counterclockwise as viewed in the figures thereby to move the piston rod 70 to the right. This shifts the piston 73 to the right against the resistance of the air pressure contained within the chamber 86 of the air bellows. Accordingly as soon as normal conditions are restored and the back pressure of the pomace in the tapered annular opening 35 returns to normal, the air pressure within the chamber 86 will react through the piston rod 70 and bifurcated lever 66 to move the sleeve 45, shaft 21 and juice extracting screw 20 to the right to restore the tapered annular pomace discharge opening 35 to the normal minimum size determined by the adjusting screw 60.

From the foregoing it will be seen that the present invention provides a very simple and effective control for a juice extractor which automatically maintains the required minimum size of pomace discharge opening and pomace back pressure suited to the particular fruit or vegetable being handled but at the same time permits yielding under abnormal conditions to permit the controlled size of the pomace discharge opening to enlarge but followed immediately by restoration to its normal size when normal conditions are reencountered.

I claim:

In a juice extractor having a base, a rotatable screw having a coaxial shaft at its discharge end journalled on said base and having its discharge end provided with an annular bevel diminishing toward said shaft, an end head on said base having a circular opening the rim of which surrounds said bevel to form a restricted annular pomace discharge opening, the passage of pomace through which produces an axial pressure against said screw; the combination therewith of means yieldingly maintaining said restricted annular pomace discharge opening at a constant size, comprising a manually adjustable stop member mounted on said base and limiting the axial movement of said shaft in the direction in which said bevel moves toward said rim, and air pressure means yieldingly holding the shaft engaged with said stop member but permitting said restricted annular pomace discharge opening to enlarge under excessive axial back pressure from said pomace against said bevel and including a sleeve surrounding said shaft; a thrust bearing interposed between said shaft and sleeve and compelling them to move axially in unison but permitting said shaft to rotate in said sleeve, a lever journalled on said base to swing about an axis perpendicular to said shaft, means operatively connecting said lever and sleeve to oscillate said lever in response to axial movement of said sleeve, an air cylinder, a piston in said air cylinder, means operatively connecting said piston with said lever, and means maintaining air under pressure in said cylinder.

References Cited in the file of this patent

UNITED STATES PATENTS

| | | |
|---|---|---|
| 890,112 | Wheelwright | June 9, 1908 |
| 1,082,821 | Richards | Dec. 30, 1913 |
| 1,835,789 | Lang | Dec. 8, 1931 |
| 2,322,791 | De Back | June 29, 1943 |
| 2,340,009 | Meakin | Jan. 25, 1944 |
| 2,658,445 | Wilen et al. | Nov. 10, 1953 |

FOREIGN PATENTS

| | | |
|---|---|---|
| 560,184 | Germany | Sept. 29, 1932 |
| 846,610 | France | June 12, 1939 |

OTHER REFERENCES

Bissett et al.: Publication reprinted from volume 69 of the Proceedings of the Florida State Horticultural Society, Orlando, Florida, November 7, 8 and 9, 1956. Article entitled "Effects of Finisher Pressure on Characteristics of Valencia Orange Concentrate," page 1 of the publication relied upon.